April 22, 1958 W. H. BERCH 2,831,926

SIGNALING SYSTEM CONTROLLED FROM A SUBSCRIBER STATION

Filed Nov. 22, 1954 2 Sheets-Sheet 1

INVENTOR.
WILLIAM H. BERCH

BY

AGENT

April 22, 1958 W. H. BERCH 2,831,926

SIGNALING SYSTEM CONTROLLED FROM A SUBSCRIBER STATION

Filed Nov. 22, 1954 2 Sheets-Sheet 2

INVENTOR.
WILLIAM H. BERCH

AGENT 2,831,926
Patented Apr. 22, 1958

2,831,926

SIGNALING SYSTEM CONTROLLED FROM A SUBSCRIBER STATION

William H. Berch, Penfield, N. Y., assignor, by mesne assignments, to General Dynamics Corporation, a corporation of Delaware Application November 22, 1954, Serial No. 470,253

10 Claims. (Cl. 179—84)

Figure 1:
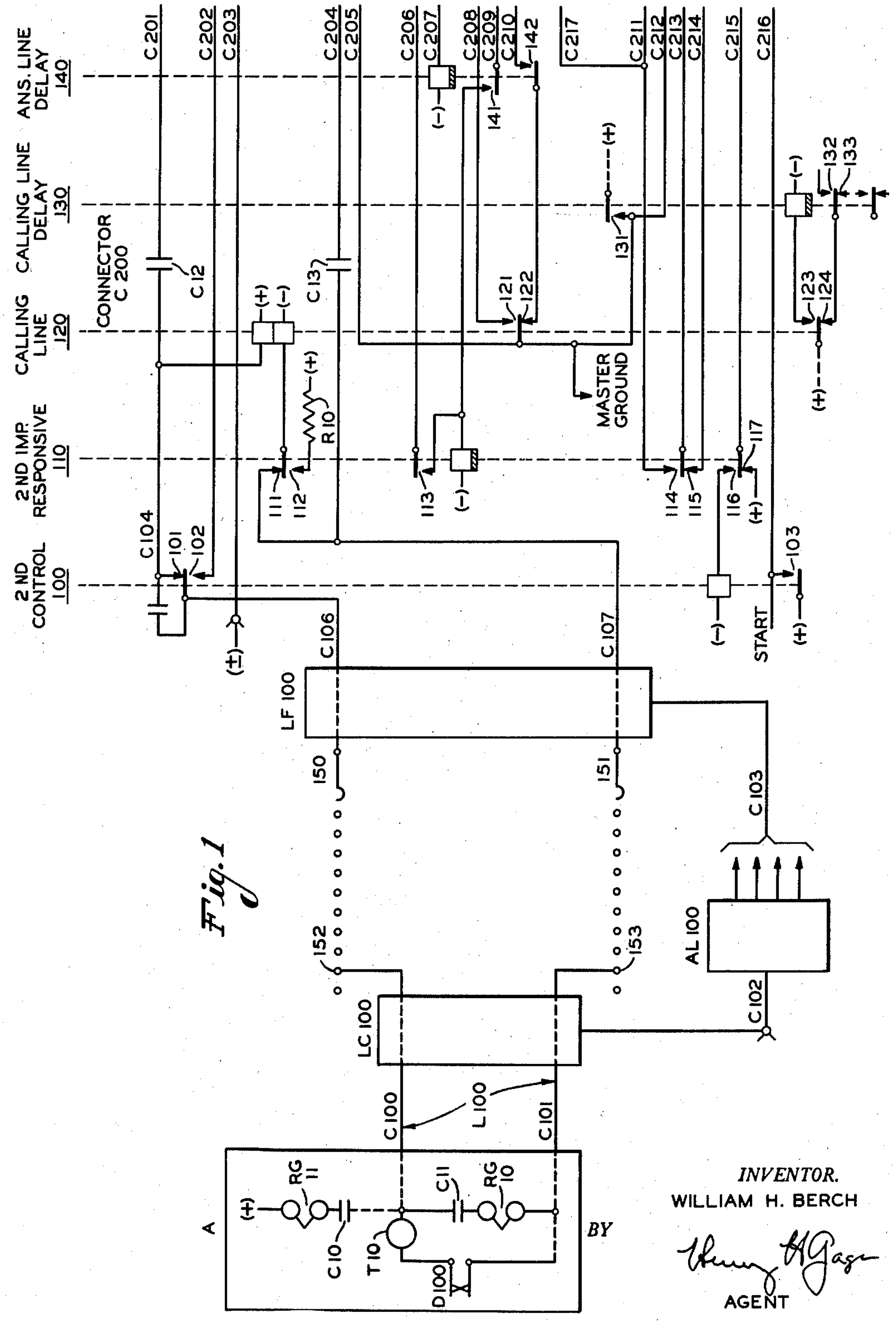

This invention relates to telephone systems and more particularly to dial telephone systems for interconnecting telephone stations.

It is an object of my invention to provide new and improved signaling means at stations in telephone systems.

It is another object of my invention to provide new and improved apparatus whereby a signaling device at the station of one of two interconnected telephone lines is energized responsive to the operation of an impulsing device at the station of the other interconnected line.

Another object of my invention is to provide an apparatus capable of carrying out the foregoing objects, means whereby an interconnected line station is signaled responsive to the transmission of predetermined sets of impulses from another interconnected line section.

Another object of my invention is to provide in apparatus capable of carrying out the foregoing objects, means whereby the simultaneous operation of the signaling devices at the stations of the interconnected lines is prevented.

Another object of my invention is to make the operation of the signaling device at each of the stations of the interconnected lines dependent upon the off-hook condition of the station to be rerung.

I accomplish these and other objects, in a preferred embodiment of my invention, by use of a telephone system comprising a plurality of lines, and a central office at which each of the lines is terminated and including central office switching means for interconnecting a calling one of the lines to a called one of the lines. Each line comprises first and second conductors; the station associated with each of the lines is equipped with a speech transmitter, an impulse transmitting device comprising a dial, and first and second signalling means, each of the latter comprising a ringer of the type energized by alternating current. At the central office, means is provided to connect a source of alternating current in series with the first signaling device at the called line station responsive to the direction of the switching means to the termination of the called line for selectively energizing the first signaling device only at the station of the called line. Also at the central office, first and second repeating means such as double-wound battery feed relays are associated with the calling and called lines, respectively, and are placed in series with a second, direct current source and are operated responsive to the flow of current through the transmitters of the calling and called line stations, respectively; the repeating relays may be operated to repeat trains of impulses transmitted from the impulsing devices of the calling and called station, respectively.

When a first preparatory train of impulses is transmitted to the central office from the impulsing device of a first of the interconnected line stations, impulse responsive means comprising a relay individual to the impulse repeating relay associated with the first line is operated responsive to the repetition of impulses by the impulse repeating relay. Operation of the impulse responsive relay is thereupon effective for operating controlling means comprising a relay individual to the impulse responsive relay. The controlling means is operative to open the speech transmission and operating circuit of the impulse repeating relay associated with the other interconnected line and to prepare a signaling circuit. Operation of the impulse responsive relay also is effective to hold the repeating relay associated with the other interconnected line in operated condition during the time that the operating circuit of the latter relay is opened (i. e., while impulses are being transmitted from the first line station).

At the conclusion of the transmission of the first preparatory impulse train referred to above, the impulse responsive relay momentarily remains in its operated condition to allow the operation of a preparing, end-of-impulse responsive means comprising a relay common to the two impulse responsive relays. Operation of the end-of-impulse relay is effective for thereafter restoring the operated impulse responsive relay to its normal condition and for preparing an operating circuit for another controlling relay individual to the end-of-impulse relay. The operating circuit of another controlling relay is completed responsive to the release of the impulse responsive relay. At the completion of operation of the end-of-impulse means, the means is held in its operated condition under the joint control of the first and second repeating means and independently of the impulse responsive means.

When a second signaling train of impulses is transmitted from the impulsing device of the first line station, the impulse responsive relay is re-energized which, in turn, re-energizes the controlling relay. Operation of the impulse repeating relay opens the locking circuit of and thereby releases the end-of-impulse responsive means. In the previously described manner, operation of the controlling means is also effective to disconnect the transmitter of the station of the other interconnected line from its series relationship with the second current source; and operation of the impulse responsive means is again effective to provide an alternate holding circuit for the repeating relay associated with the other interconnected line.

The controlling relay is jointly effective with the now operated other controlling relay for selectively energizing the second signalling device at the station of the other interconnected line. At the conclusion of the second operation of the impulse responsive means, the impulse responsive, controlling and other controlling means are released to prepare the apparatus for another, similar reringing operation.

Figure 2:
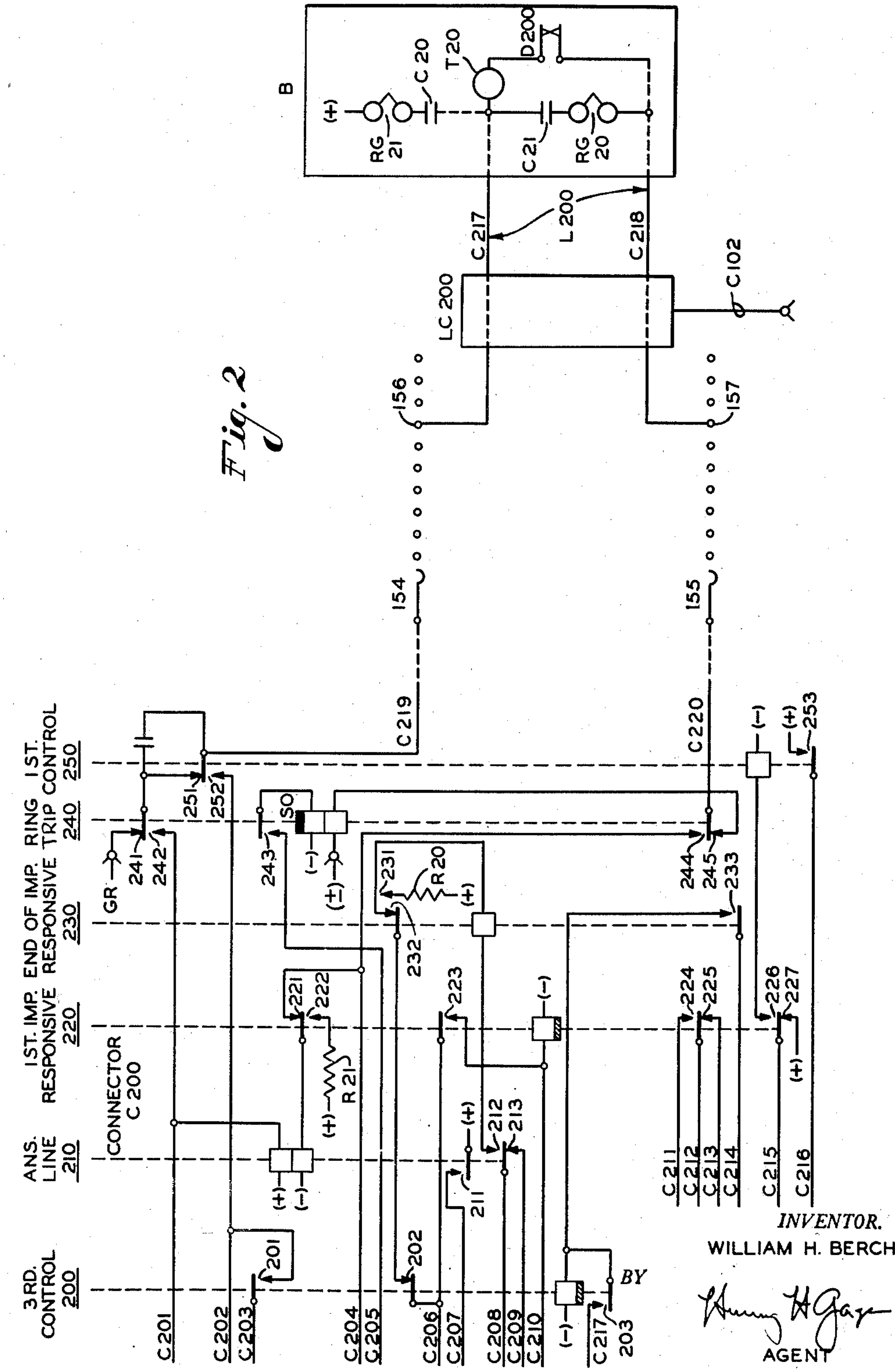

Further objects and advantages of my invention will become apparent as the following description proceeds and the features of novelty which characterize the invention will be set forth and pointed out with particularity in the claims annexed to and forming a part of this specification. For a better understanding of my invention, reference may be had to the accompanying drawings in which:

Fig. 1 shows a station A in skeletonized form, line L100, a line circuit LC100, line finder LF100 and allotter AL100, all in block form, and some of the pertinent parts of connector C200; and Fig. 2 shows the remainder of the pertinent parts of the connector C200; line circuit LC200, line L200 in block form, and a skeletonized form of a station B.

Part of the equipment is made to function from energy supplied from a first source of current such as an alternating current generator capable of delivering 20 cycles per second. In accordance with standard telephone practice, a ground conductor referred to hereafter as "generator return" and symbolically as GR is connected through a source of direct, tripping current to one side of the generator; the other side of the generator is referred to hereafter as "generator" and symbolically as (±).

Another part of the equipment described in the following description is made to function from energy supplied from a second source of electrical current such as a battery; the most negative, ungrounded plate of such a battery is referred to hereafter as "battery" and symbolically as (−), and the most positive, grounded plate of which is hereafter referred to as "ground" and symbolically in the drawings as (+).

In the description which follows, reference is made to the apparatus supplied at any of the stations, such as A or B, which is pertinent to the present invention and includes the transmitted, the first and second ringing devices, the hookswitch, and the impulsing means comprising the dial, all of which are well known in the telephone art; for this reason, it is not believed to be necessary to describe their structure in detail. In the case of the switching equipment at the central office, the description is confined to the details which are pertinent to the present invention; it does not describe the apparatus by which the calling line is switched to establish a connection to the called line in other than generalities because the details of the switching means do not pertain to the present invention. It is understood that the switching operation can be accomplished by any suitable apparatus, such as the well known step-by-step system under the control of the dial of the calling telephone, and that such a system will function satisfactorily with the preferred embodiment of my invention, which is next described.

To place a call from a telephone station, such as A, over a calling line, such as L100, to a called line, such as L200 and station B, the telephone at the calling station is removed from its hookswitch thereby completing, by means including the contacts of dial D100, a connection between conductors C100 and C101 of the calling line L100. The line circuit LC100 is thereby energized and applies ground to the common start lead C102 of common allotter circuit AL100 to energize the latter. Energization of allotter circuit AL100 is effective to assign an idle line finder such as LF100 to the calling line and to direct over a plurality of conductors, shown collectively as conductor C103, the switch LF100 to cause the latter to be advanced until wipers 150 and 151 of the finder switch encounter terminals 152 and 153 on which calling line L100 is terminated. Responsive to the extension of wipers 150 and 151 to the calling line terminals 152 and 153, a connection is completed from conductors C100 and C101 to the talking conductors C106 and C107, respectively, of connector circuit C200 to complete the following loop circuit for energizing the first impulse repeating means comprising line relay 120: from ground through the upper winding of relay 120, conductor, C104, break contact 101, conductor C106, wiper 150, terminal 152, conductor C100 of line L100, transmitter T10, contacts of dial D100, conductor C101, terminal 153, wiper 151, conductor C107, break contact 111, and the lower winding of calling line relay 120 to battery.

The calling line relay 120 operates upon completion of the above completed loop and thereafter functions as a means for repeating impulses transmitted from the contacts of dial D100 at calling station A. Operation of relay 120 is effective to establish an operating circuit for the well known calling line delay relay 130 at operated contacts 123; and to prepare an operating circuits for second impulse responsive relay 110 and end-of-impulse responsive relay 230 at make contacts 121. Operation of calling line delay relay 130 is effective to extend ground to the well known master ground lead shown as conductors C205 and C212 at contacts 131.

Dial D100 at station A is thereupon operated a number of times to send a corresponding number of impulse trains over line L100 for impulsing calling line relay 120 to cause conventional switch directing means (not shown) of connector C200, to direct wipers 154 and 155 to the terminals of a called line such as L200. Delay relay 130, being a slow release type, remains in operated condition throughout the impulsing of relay 120. Responsive to the extension of wipers 154 and 155 to terminals 156 and 157 of line L200, a circuit is completed to place a first signaling device at called line station B, such as ringer RG20, in series with a first current source comprising the alternating generator over the following circuit: from generator through the lower winding of ring trip relay 240, break contacts 245, conductor C220, wiper 155, terminal 157, conductor C218, the windings of ringer RG20, blocking capacitor C21, conductor C217, terminal 156, wiper 154, conductor C219, break contacts 251, and break contacts 241 to the generator return. Selective energization of ringer RG20 is effective to signal the subscriber at station B. Ringer RG21 is not energized at this time because its winding is shorted out by the application of ground to conductor C217.

Upon answering of the telephone at station B in response to energization of ringer RG20, removal of the telephone from the hookswitch is effective to complete a tripping circuit for disconnecting the above described ringing current source by closing the hookswitch (not shown) to extend a shorting circuit comprising transmitter T20 and the contacts of dial D200 around ringer RG20 to allow direct current from the above described tripping current source connected in series with the generator to flow over the above described path for energizing ringer RG20. The flow of direct current operates ring trip relay 240 which locks up at contacts 243 over an obvious circuit including upper winding of the ring trip relay 240 to master ground conductor C205. Relay 240 thereafter remains locked up until master ground is opened at contacts 131 which occurs when the telephone at station A is returned to its hookswitch.

Operation of ringing trip relay 240 is effective to transfer conductors C219 and C220 from their normal series relationship to the signaling generator through contacts 241 and 245, respectively, to a connection with conductors C100 and C101 of the calling line station L100 at make contacts 242 and 244, respectively. Operation of relay 240 is also effective to place the transmitter T20 and the contacts of dial D200 of station B in series with the above referred to second, direct current source over the following called line loop: from ground through the upper winding of relay 210, make contact 242, break contact 251, conductor C219, wiper 154, terminal 156, conductor C217, contacts of dial D200, conductor C218, terminal 157, wiper 155, conductor C220, make contact 244, break contact 221, and the lower winding of relay 210 to battery. Relay 210 thereupon operates and is effective to repeat impulses caused by opening and closing the contacts of dial D200 of the called line station B. A connection has now been established between the calling and called line stations A and B, respectively.

Operation of relay 210 is effective to operate answering line delay relay 140 by completing an energizing circuit for the latter relay at make contacts 211, and to further prepare the above-referred to operating circuit for end-of-impulse responsive relay 230 at make contacts 212.

Operation of answering line delay relay 140 is effective to prepare the energizing circuit of first and second impulse responsive relays 220 and 110, respectively, at contacts 142 and 141, respectively, thereby making operation of both impulse responsive relays dependent upon the flow of current from the battery in the loop of called line station B, and upon the presence of ground on the master ground lead which is brought about by the flow of direct current through the loop of calling line station A.

As previously pointed out, a connection has now been established from calling station A to called station B; calling line relay 120 and answering line relay 210 are both held in operated condition under the control of the contacts of dials D100 and D200 of stations A and B, respectively. Relays 120 and 210 thereafter operate as first and second repeating means, respectively, responsive to further impulsing of dials D100 or D200.

In the system shown, either of the connected subscriber line telephones can resignal the other telephone by sending a first train of impulses to the central office for operating the impulse responsive means (relay 220 or 110), thereby preparing controlling means (relay 250 or 100) for operation; and by thereafter sending a second train of impulses to operate the impulse responsive means a second time, thereby operating both the controlling means and another controlling means. Means utilizing the controlling means and other controlling means (both in operated condition) applies signaling current from the alternating generator to energize the second signaling device, such as ringer RG11 or RG21, only of the station to be resignaled.

Assuming that the subscriber at station A of calling line L100 wishes to resignal station B, a first operation of dial D100 is effective to open and close the previously described line loop for energizing calling line relay 120. Relay 120 thereupon is operated as a repeating means by being pulsed in accordance with the number of pulses sent from dial D100 to open and close contacts 121 and 122. Calling line delay relay 130, being a slow release type, is held operated throughout the impulsing operation of relay 120 even though its operating circuit is momentarily opened at contact 123. On the first release of relay 120, a circuit is completed for energizing the first impulse repeating relay 220 from master ground through break contacts 122, make contacts 142, and the winding of relay 220 to battery. Relay 220 thereupon operates and is held operated for the duration of the impulsing of relay 120 because it is a slow release type. At the conclusion of impulsing, relay 120 comes to rest in its operated condition, the contacts of dial D100 having then reclosed at the conclusion of the transmission of impulses.

At the conclusion of the transmission of the first train of impulses, the pulsed ground short applied to the winding of end-of-impulse responsive relay 230 through contacts 122, 142, 223, 202, and 232 is removed. First impulse responsive relay 230 is completed from battery lease, being a slow release type, so that a circuit for holding relay 220 and for energizing and operating end-of-impulse responsive relay 230 is completed from battery through the winding of relay 220, make contacts 223, break contacts 202 and 232, the winding of end-of-impulse responsive relay 230, make contacts on 212 and 121 to master ground at contact 131. Operation of relay 220 is also effective for completing an operating circuit for first controlling relay 250 at contacts 226; for opening at contacts 225 the energizing circuit for a third control relay 200; for disconnecting the lower winding of relay 210 from one of the line conductors at contacts 221; and for preventing the release of answering line relay by the opening of the loop of the called line at contacts 251 from releasing relay 210 by placing the lower winding in series with the direct current source over the following circuit: ground, resistor R21, contacts 222 to the lower winding of answering line relay 210 to battery.

Operation of end-of-impulse responsive relay 230 is effective to release relay 220 by opening the above described holding circuit for relay 220 at break contacts 232, and to establish a holding circuit for relay 230 from battery through resistor R20, make contact 231, the winding of relay 230, make contact 212, make contact 121 to master ground at contact 131. The end-of-impulse relay 230 is thereafter held operated until such time as a second impulse train is transmitted from station A for pulsing calling line relay 120 a second time.

At the conclusion of the first train of impulses and following the release of first impulse responsive relay 220 and operation of end-of-impulse responsive relay 230, an operating circuit for third controlling relay 200 is established from battery to the winding of relay 200, make contact 233, break contacts 115 and 225 to master ground. Operation of relay 200 is effective to prepare a locking circuit for relay 200 at make contacts 203; to open the operating circuit of relay 230 at contacts 202; and to prepare for placing the second signaling device comprising ringer RG21 at called line station B in series with the alternating generator at make contacts 201.

When a second train of impulses is transmitted from the calling line station A's dial D100, the calling line relay 120 is again caused to repeat the impulses. The first opening of contacts 121 causes the release of end-of-impulse responsive relay 230 by opening the latter's previously described locking circuit. Repetition of the second train of impulses causes relay 120 to reoperate first impulse responsive relay 220 a second time over the previously traced circuit. Reoperation of relay 220 is effective to complete a circuit for reoperating first control relay 250 over the latter's previously described locking circuit.

Joint operation of the first control relay 250 and third control relay 200 is effective to selectively energize ringer RG21 at station by placing the ringer in series with the alternating current generator from generator, contact 201, make contact 252, conductor C219, wiper 154, terminal 156, conductor C217, blocking capacitor C20, ringer RG21 to ground. Ringer RG20 is not energized at this time because no connection to generator return is provided for it.

It is to be noted that in operating, relay 250 opens the previously traced loop of the answering line relay 210 during the time that ringer RG21 is being energized, so that in order to prevent relay 210 from releasing it is necessary to reclose a circuit to place at least one of the windings of relay 210 in series with the direct current source; such a circuit has been previously described. While impulse responsive relay 220 is operated, the previously referred to holding circuit for third control relay 200 is completed from battery, the winding of third control relay 200, make contact 203, make contact 224 to master ground so that even though the operating circuit of relay 200 is opened by the release of relay 230, relay 200 continues to be held in its operated condition until the second train of impulses has been completely transmitted and relay 220 released.

At the conclusion of the second train of impulses, calling line relay 120 comes to rest in its operated condition so that the first impulse responsive relay 220 is released to open the holding circuit of third control relay 200, which likewise releases. Release of first impulse responsive relay 220 is also effective to restore first control relay 250 to its normal condition which releases restoring the previously traced talking loop of called line station B to its connection to the calling line station A.

In the event that the subscriber at station B wishes to signal the station A while a connection is extended between stations A and B, and station A is in off-hook condition, the dial 200 at station B is operated a first and second time to send first and second trains of impulses to the central office. In response to a first train of impulses, answering line relay 210 operates as a repeating means (i. e., is impulsed) to operate second impulse responsive relay 110 over the following circuit: from battery, the winding of relay 110, make contact 141, break contact 213, make contact 121 to master ground. At the end of the transmission of the first train of impulses, relay 210 comes to rest in its operated condition, the contacts of dial D200 having been restored to their normally closed condition.

A locking circuit for relay 110 and an operating circuit for end-of-impulse responsive relay 230 is completed from battery, the winding of relay 110, make contact 113, break contacts 202 and 232, the winding of relay 230, make contacts 212 and 121 to master ground. Operation of second impulse responsive relay is effective to open the previously traced loop of calling line relay 120 at break contact 111 and to thereafter hold relay 120 in operated condition by connecting the lower winding of calling line relay 120 in series with the direct battery current source from ground through resistor R10, make contact 112, the lower winding of calling line relay 120 to battery so that the lower winding of relay 120 is disconnected from the conductor of the calling line during the time that second impulse responsive relay 110 is operated. Operation of relay 110 is also effective for operating second control relay 100 by completing a circuit from battery, the winding of relay 100, make contact 116 and break contact 227 to ground. Operation of second control relay in response to the first train of impulses transmitted from the dial of station B is without effect at this time.

At the conclusion of the first train of impulses from station B, answering line relay comes to rest in its operated condition, the contacts of dial D210 having come to rest in a closed position so that the operating circuit of second impulse responsive relay 110 is thereupon opened. Relay 110 being a slow release type does not release immediately but remains operated for an interval of time sufficient to operate end-of-impulse relay 230. Operation of relay 230 and the release of first impulse responsive relay 110 is effective to operate the third control relay 200 from battery through the winding of relay 200, make contact 233, break contacts 115 and 225 to master ground; relay 200 thereupon operates to open the locking circuit of relay 110 and operating circuit of end-of-impulse responsive relay 230, and to prepare to place the signaling alternating generator in series with second signaling device comprising ringer RG11 at station A.

When the second train of impulses from the dial of station B is caused to again operate the repeating means comprising relay 210, a circuit for operating first impulse responsive relay 110 is completed, as noted above, to operate second control relay 100 in the previously described manner. Operation of second impulse responsive relay is also effective to establish a locking circuit to hold third control relay 200 in operated condition throughout the pulsing of the second digit from battery, the winding of relay 200, make contact 203, make contact 114, break contact 225 to master ground.

The pulsing of relay 210 is effective to open the operating circuit of end-of-impulse responsive relay 230 at make contact 212 which thereupon releases relay 230 to open the previously described holding circuit of third control relay 200.

Means utilizing the third control relay 200 and second control relay 100 (in operated condition) is effective to place the second signaling device comprising ringer RG11 in series wtih the alternating current source over the following circuit: from generator through make contacts 201, 102, conductor C106, wiper 150, terminal 152, line conductor C100, blocking capacitor C10, the windings of ringer RG11 to ground to generator return. Ringer RG11 is thereupon selectively energized, no ground return circuit for ringer RG10 being supplied at this time.

At the conclusion of the second train of impulses, answering line relay 210 comes to rest in its operated condition to open the previously described circuit of the second impulse responsive relay 110 which thereupon release to open the operating circuit of second control relay 100 which also releases. Release of relays 100 and 110 is effective to restore the calling loop circuit of calling line relay 120 so that relay 120 is thereupon held in its operated condition over its original operating circuit. Release of relay 110 is also effective to open the holding circuit for third control relay 200 at make contacts 114 which thereupon releases relay 200, thus restoring the circuit to its normal talking condition and the connection from the subscriber at station A to the subscriber at station B.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. In a telephone system, a plurality of lines, each of said lines comprising a plurality of conductors, a station connected to each of said lines comprising a signaling device and an impulsing device, means for interconnecting a first one of said lines with a second one of said lines, means operable for repeating trains of impulses transmitted from said station impulsing device over said first line, impulse responsive means operated responsive to each operation of said repeating means, first controlling means operated responsive to each operation of said repeating means, preparing means operated responsive to the operation of said impulse responsive means at the conclusion of a first operation of said repeating means for holding in operated condition and for thereafter releasing said impulse respeonsive means, other controlling means operated responsive to the operation of said preparing means and to the release of said impulse responsive means for preventing the reoperation of said preparing means, and means utilizing said first and said other controlling means for controlling the energization of said signaling device at said second station over at least one of said second line conductors, said repeating means operated in response to a second train of impulses being effective for restoring said preparing means, said impulse responsive means and said preparing means in operated condition being jointly effective for retaining said other controlling means in operated condition whereby said signaling device at said second line station is energized in response to a second operation of said repeating means, and said other controlling means is released responsive to the release of said first controlling means.

2. In a telephone system, a plurality of lines terminating at a central office, a station connected to each of said lines, each station comprising an impulsing device and a first and second signaling device, a calling one of said lines, a called one of said lines, switching means in said office for extending a connection from said calling line to said called line, means responsive to the extension of a connection to said called line for selectively energizing said first signaling device at said called line station, first controlling means thereafter operated responsive to the transmission of trains of impulses from said impulsing device of said calling line station, other controlling means operative at the end of transmission of a first train of impulses from said calling line station, and means utilizing said first controlling means and said other controlling means for selectively energizing said second signaling device at said called line station.

3. In a telephone system, a plurality of lines terminating at a central office, a station connected to each of said lines, each station comprising an impulsing device and a first and second signaling device, a calling one of said lines, a called one of said lines, switching means in said office for extending a connection from said calling line to said called line, means responsive to the extension of a connection to said called line for selectively energizing said first signaling device at said called line station, first and second controlling relays operated responsive to the transmission of each train of impulses from said calling and said called line station impulsing devices, respectively, other controlling means common to said first and second controlling relays operated responsive to the termination of a first train of impulses from either said calling or said called line station, means utilizing said other controlling means and said first controlling relay for selectively energizing said second signaling device at said called line station, and means utilizing said second controlling relay and said other controlling means for energizing said second signaling device at said calling line station, whereby said second signaling devices and said called and calling station are energized responsive to the transmission of a first and a second train of impulses from impulsing devices of said calling and said called stations, respectively.

4. In a telephone system, a plurality of lines terminating at a central office, a station connected to each of said lines, each station comprising an impulsing device and a first and a second signaling device, a calling one of said lines, a called one of said lines, switching means in said office for extending a connection from said calling line to said called line, means responsive to the extension of a connection to said called line for selectively energizing said first signaling device at said called line station, repeating means operable for repeating trains of impulses from said impulsing device of said calling line station, supervisory means effective for repeating supervisory signals from said called line station, first signal controlling means, impulse responsive means jointly responsive to the operation of said repeating means and said supervisory means for causing said first signal controlling means to be effective in response to the repetition of each train of impulses by said repeating means, preparing means operative responsive to a first operation of said impulse responsive means, second signal controlling means operative responsive to the operation of said preparing means, means utilizing said first and said second signal controlling means for selectively energizing said second signaling device at said called line station.

5. In a telephone system; a plurality of lines terminating at a central office; a station connected to each of said lines, each station comprising an impulsing device and a first and a second signaling device; a calling one of said lines; a called one of said lines; switching means for extending a connection from said calling line to the termination of said called line; means responsive to the extension of a connection to said called line termination for selectively energizing said first signaling device at said called line station; first and second means operable for repeating trains of impulses transmitted from said impulsing devices of said calling and said called line stations, respectively; first and second controlling means; first and second impulse responsive means operated responsive to said first and said second repeating means, respectively, for rendering effective said first and said second controlling means, respectively; other controlling means common to said first and said second controlling means; preparing means effective responsive to operation of said impulse responsive means at the end of a first operation of said repeating means; means operated responsive to the operation of said preparing means for rendering said other controlling means effective; means utilizing said other controlling means and said first controlling means for selectively energizing said second signaling device of said called line station in response to a second operation of said first impulse responsive means; and said other controlling means and said second controlling means jointly effective for selectively energizing said second signaling device of said calling line station in response to a second operation of said second impulse responsive means.

6. In a telephone system; a plurality of lines; each of said lines comprising a first and a second conductor and having a termination at a central office; a station connected to each of said lines, each station comprising an impulsing device and first and second signaling devices; a calling one of said lines; a called one of said lines; switching means for extending a connection from said calling line to said called line termination; a current source; means responsive to the extension of a connection to said called line termination for completing a series connection comprising said first signaling device at said called line station, each of said called line conductors, and said current source, whereby said first signaling device at said called station is selectively energized; first and second means operable for repeating trains of impulses transmitted from said impulsing devices of, and supervisory signals from said calling and said called lines stations, respectively; first and second controlling means; first and second impulse responsive means operated responsive to the operation of said first and said second repeating means, respectively, for rendering effective said first and said second controlling means, respectively; means for preventing said first and said second impulse responsive means from being simultaneously effective to operate said first and said second controlling means; other controlling means common to said first and said second controlling means; preparing means operable responsive to the joint operation of said first and said second repeating means at the conclusion of operation of one of said repeating means for rendering said other controlling means effective; means utilizing said other controlling means and said first controlling means for completing a series connection comprising said second signaling device at said called line station, one of said called line conductors, and said current source, whereby said second signaling device at said called station is selectively energized; and means utilizing said other controlling means and said second controlling means for completing a series connection comprising said second signaling device of said calling line station, one of said calling line conductors, and said current source whereby said second signaling device of said calling line is selectively energized in response to a second operation of said second repeating means.

7. The system set forth in claim 5, wherein said preparing means is rendered ineffective responsive to the repetition by either of said repeating means of a second train of impulses from the impulsing device of said calling or said called station, said other controlling means in operated condition is effective to prevent said preparing means from being reoperated, and said impulse responsive means in operated condition are thereafter effective to maintain said other controlling means in its operated condition whereby said second signaling devices at said called and said calling line stations are energized until the end of the second operation of said first and said second repeating means, respectively.

8. In a telephone system; a central office; a plurality of lines; each of said lines comprising a first and a second conductor and having a termination at a central office; a station connected to each of said lines, each station comprising an impulsing device and first and a second signaling devices; means at each station for interconnecting said conductor of said associated line; a calling one of said lines; a called one of said lines; a first and a second current source; switching means for extending a connection from said calling line to said called line termination; means responsive to the extension of a connection to said called line termination for completing a first series connection comprising said first signaling device at said called line station, each of said called line conductors, and said first current source whereby said first signaling device at said called line station is selectively energized; first and second relays having first and second windings operable for repeating trains of impulses transmitted from said impulsing devices of said calling and said called line stations, respectively; each relay being energized over a second series circuit comprising at least one of said conductors of said calling or said called line, at least one of said relay windings, and said second current source; first and second controlling means, first and secod impulse responsive means operated responsive to the repetition of impulses by said first and said second repeating relays, respectively, for rendering effective said first and said second controlling means, respectively; other controlling means common to said first and said second controlling means; preparing means operated responsive to the joint operation of one of said impulse responsive means and both said repeating relays at the end of transmission of a first train of impulses from said impulsing device of said calling or said called line station for rendering said other controlling means effective; said other controlling means and said first controlling means being jointly effective for completing a series connection comprising said second signaling device at said called line station, one of said called line conductors and said first current source, whereby said second signaling device at said called station is selectively energized in response to the repetition of a second train of impulses transmitted from said calling line station by said repeating relay; said first controlling means effective for opening said second series circuit of said called line; said other controlling means and said second controlling means being jointly effective for completing a series connection comprising said second signaling device of said calling line station, one of said calling line conductors and said first current source, whereby said second signaling device of said calling line is selectively energized in response to repetition of a second train of impulses by said second repeating relay; said second controlling means effective for opening said second series circuit of said calling line; operation of said first and said second impulse responsive means being effective for placing at least one of said relay windings in series with said second current source over an alternate path, and for opening said second series circuit of said calling and said called line respectively, whereby said first and second relays are maintained in operated condition without interference from current flowing from said first source through said station interconnecting means and said line conductors during the time that said second signaling devices at said line stations are energized.

9. In a telephone system, a station comprising a transmitter and a signaling device, an office comprising a relay and a first and second source of current, said relay comprising a plurality of windings, a line comprising a plurality of conductors for connecting said station to said office, means at said station for interconnecting said line conductors, a first series connection comprising at least one of said conductors, said transmitter, at least one of said relay windings, and said first current source for energizing said transmitter and causing the operation of said relay, a second series connection comprising said signaling device, at least one of said line conductors, and said second current source for energizing said signaling device, signaling means for controlling the completion of said second series circuit, and means for opening said first series circuit and for placing at least one of said relay windings in series with said first current source over an alternate path whereby said relay may be maintained in operated condition without interference from current flowing from said second source through said station interconnecting means and said line conductors during the time that said signal controlling means is effective.

10. The device set forth in claim 9 wherein said first series circuit opening means is also effective for rendering said signaling means effective.

References Cited in the file of this patent

UNITED STATES PATENTS

| | | |
|---|---|---|
| 1,183,214 | Lundell | May 16, 1916 |
| 1,393,502 | Clausen | Oct. 11, 1921 |
| 1,512,584 | Dunyam | Oct. 21, 1924 |
| 2,321,412 | Neiswinter | June 8, 1943 |

UNITED STATES PATENT OFFICE

CERTIFICATE OF CORRECTION

Patent No. 2,831,926 April 22, 1958

William H. Berch

It is hereby certified that error appears in the printed specification of the above numbered patent requiring correction and that the said Letters Patent should read as corrected below.

Column 1, line 25, for "an" read -- in --; line 29, for "section" read -- station --; column 3, line 15, for "transmitted" read -- transmitter --; line 54, strike out the comma after "conductor"; line 66, for "circuits" read -- circuit --; column 4, line 32, after "including" insert -- the --; line 52, after "is" insert -- thereafter --; column 5, line 42, strike out "230 is completed from battery" and insert instead -- 220 does not immediately re- --; column 7, line 53, for "wtih" read -- with --; line 64, for "lease" read -- leases --; column 8, line 22, for "respeonsive" read -- responsive --; column 10, line 3, for "lines" read -- line --; line 67, for "secod" read -- second --.

Signed and sealed this 5th day of August 1958.

(SEAL)
Attest:

KARL H. AXLINE
Attesting Officer

ROBERT C. WATSON
Commissioner of Patents